US008744893B2

(12) United States Patent
Dreimann et al.

(10) Patent No.: US 8,744,893 B2
(45) Date of Patent: Jun. 3, 2014

(54) METHOD FOR ANALYZING RISKS IN A TECHNICAL PROJECT

(75) Inventors: Markus Dreimann, Munich (DE); Petra Ehlers, Baar-Ebenhausen (DE); Andre Goerisch, Munich (DE); Oliver Maeckel, Heimstetten (DE); Ralph Sporer, Weisendorf (DE); Alexander Sturm, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1641 days.

(21) Appl. No.: 11/783,736

(22) Filed: Apr. 11, 2007

(65) Prior Publication Data

US 2007/0255583 A1 Nov. 1, 2007

(30) Foreign Application Priority Data

Apr. 11, 2006 (DE) .................. 10 2006 017 031

(51) Int. Cl.
*G06Q 10/00* (2012.01)
*G06Q 40/00* (2012.01)

(52) U.S. Cl.
USPC ........................................ 705/7.28; 705/7.36

(58) Field of Classification Search
USPC .............................................. 705/7.11–7.42
See application file for complete search history.

(56) References Cited

U.S. PATENT DOCUMENTS

| | | | | |
|---|---|---|---|---|
| 5,850,516 A * | 12/1998 | Schneier | ........................ | 726/25 |
| 6,560,541 B1 * | 5/2003 | Singh | ............................. | 702/19 |
| 7,630,914 B2 * | 12/2009 | Veeningen et al. | ............... | 705/7 |
| 7,653,563 B2 * | 1/2010 | Veeningen et al. | ............... | 705/7 |
| 2003/0139993 A1 * | 7/2003 | Feuerverger | ..................... | 705/36 |
| 2003/0229509 A1 * | 12/2003 | Hall et al. | .......................... | 705/1 |
| 2005/0015273 A1 * | 1/2005 | Iyer | .................................... | 705/1 |
| 2005/0209866 A1 * | 9/2005 | Veeningen et al. | ............... | 705/1 |
| 2005/0209897 A1 * | 9/2005 | Luhr | ................................. | 705/7 |
| 2005/0228622 A1 * | 10/2005 | Jacobi | ............................... | 703/2 |
| 2006/0009997 A1 * | 1/2006 | Felix | ................................ | 705/1 |
| 2006/0069581 A1 * | 3/2006 | Chien et al. | ....................... | 705/1 |
| 2006/0259336 A1 * | 11/2006 | Anas et al. | ........................ | 705/7 |

FOREIGN PATENT DOCUMENTS

WO    WO2006/021477 A2    3/2006

OTHER PUBLICATIONS

US-GAAP—United States Generally Accepted Accounting Principles: http://cpaclass.com/gaap/gaap-us-01a.htm.
International Standard IEC 61508-1, 1998.

* cited by examiner

*Primary Examiner* — Sujay Koneru
(74) *Attorney, Agent, or Firm* — Staas & Halsey LLP

(57) ABSTRACT

A method analyzes risks in a technical project for developing or manufacturing a technical system or technical components or a technical process, wherein the following steps are carried out in a risk identification process: a) provision or determination of a large number of qualitative evaluations of risks in the technical project; b) determination of a large number of quantitative evaluations of the risks; c) comparison of the qualitative and quantitative evaluations for each risk, as a result of which a comparison outcome is established for each risk; d) definition of a permissible region of comparison outcomes; e) classification of the risks that are situated outside the permissible region as unacceptable risks; f) analysis of the unacceptable risks in order to identify uncertainties in the risk analysis and further risks.

23 Claims, 4 Drawing Sheets

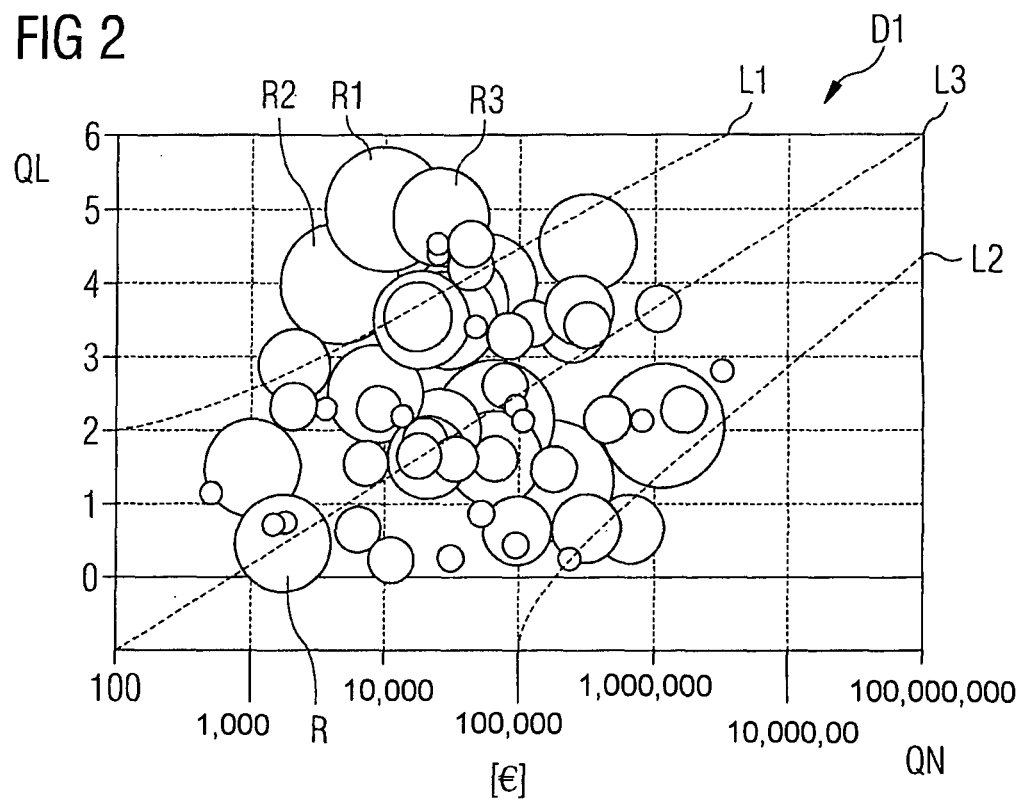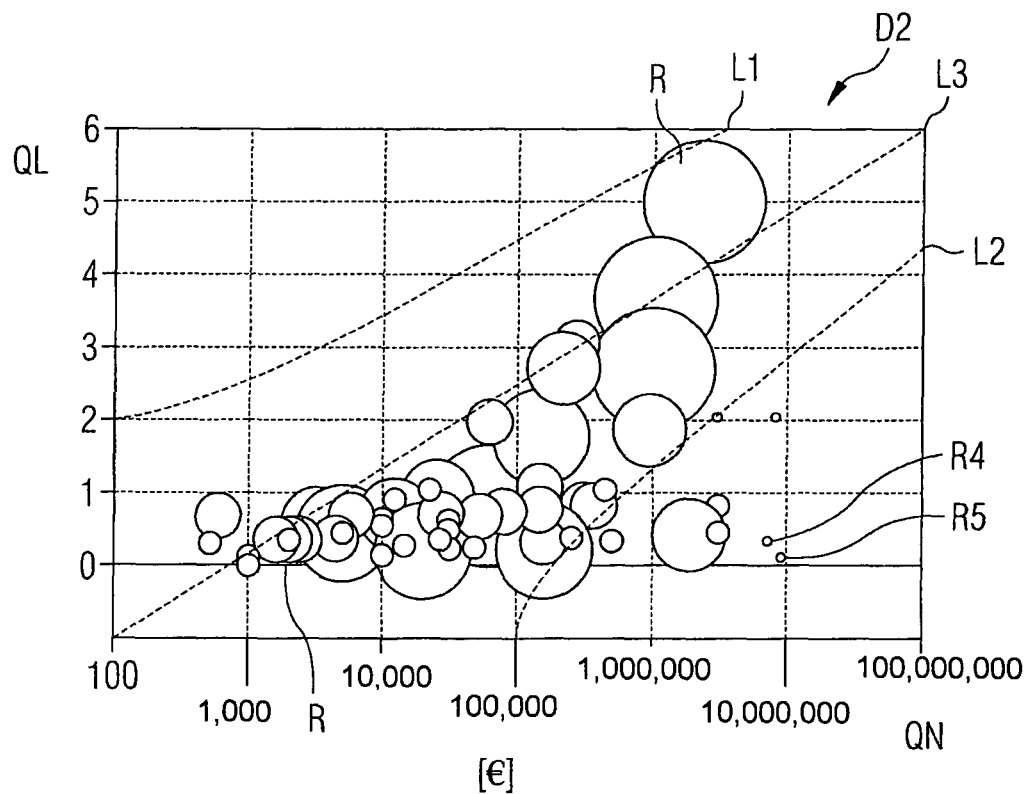

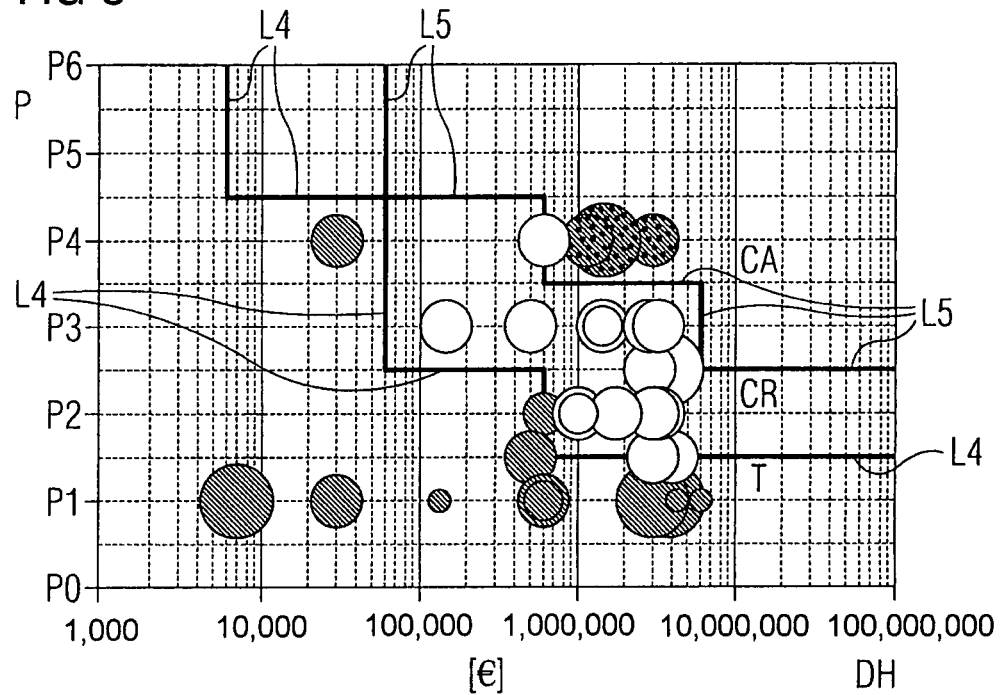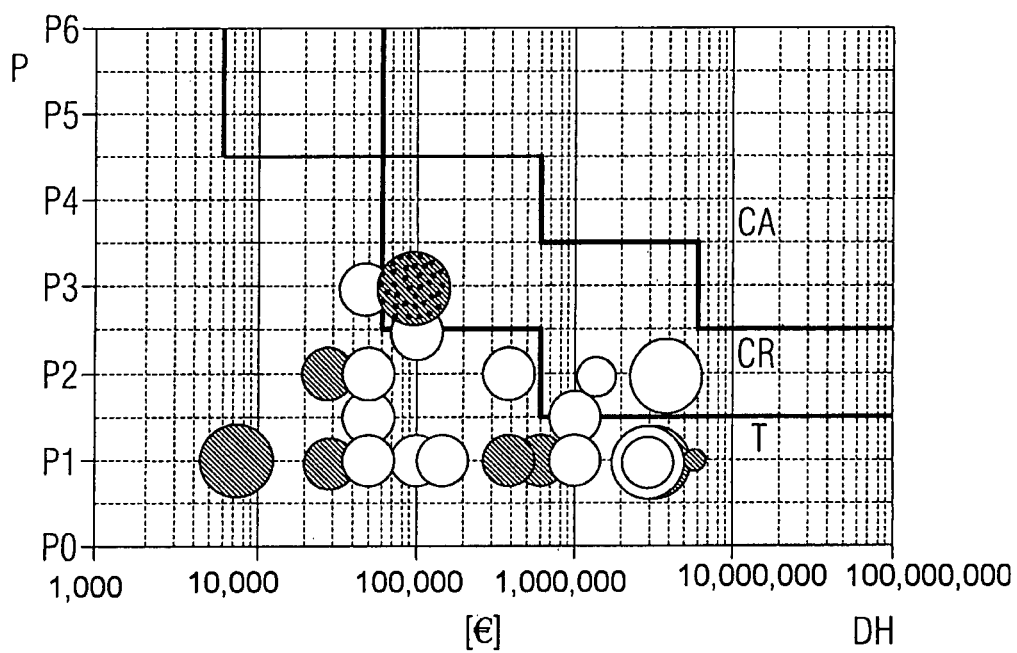

METHOD FOR ANALYZING RISKS IN A TECHNICAL PROJECT

CROSS REFERENCE TO RELATED APPLICATIONS

This application is based on and hereby claims priority to German Application No. 10 2006 017 031.8 filed on Apr. 11, 2006, the contents of which are hereby incorporated by reference.

BACKGROUND

The invention relates to a method for analyzing risks in a technical project for developing or manufacturing a technical system or technical components or a technical process.

The analysis of risks in technical projects is one of the most important processes for reducing project risks and the associated potential cost of errors. Nowadays, guidelines are increasingly applied at company level that define the handling of such project risks for balance sheet purposes. An example of these guidelines, which every public limited company must observe, comprises the accounting principles according to US-GAAP (United States Generally Accepted Accounting Principles). These guidelines provide a concrete description of the US accounting regulations and the associated processes. In order to be able to include project risks in a suitable manner in financial balance sheets, the technical risks in the project must be estimated in a suitable manner, where the accounting regulations do indeed specify how risks are to be included in the balance sheet but do not explain how qualitatively determined technical risks are to be converted into quantitatively recordable risks for use in the balance sheet.

At the technical level, a large number of methods for technical risk analysis already exists, such as the well-known FMEA method (FMEA=Failure Mode and Effects Analysis), for example. These methods are primarily applied in the field of product development, but bear no relation to an assessment of economic viability, that is to say the risks are only evaluated qualitatively and not quantitatively as well.

However, it is desirable with regard to the major projects implemented by a company that risk assessments are implemented from the company viewpoint that also evaluate the existing technical project risks in economic terms. In the case of very large projects, in fact, unconsidered risks involving a large amount of economic damage can result in an incorrect balance sheet classification, and in the event of the occurrence of such risks, this can also bring with it the insolvency of the company in certain circumstances.

SUMMARY

One possible object of the invention is therefore to create a method for risk analysis in a technical project, which includes not only a qualitative risk evaluation but also the economic evaluation of the risks.

The inventors propose a method that incorporates a risk identification process, in which the following steps are carried out:
a) provision or determination of a large number of qualitative evaluations of risks in the technical project;
b) determination of a large number of quantitative evaluations of the risks;
c) comparison of the qualitative and quantitative evaluations for each risk, as a result of which a comparison outcome is established for each risk;
d) definition of a permissible region of comparison outcomes;
e) classification of the risks that are situated outside the permissible region as unacceptable risks;
f) analysis of the unacceptable risks in order to identify uncertainties in the risk analysis and further risks.

The method therefore provides a comparison of qualitative and quantitative evaluations and establishes, by the definition of a permissible region of comparison outcomes, the points in the risk identification at which uncertainties exist in the form of unacceptable risks. In this respect, the term "region" can comprise one or more continuous blocks of comparison outcomes, but also a discrete set of comparison outcomes. The unacceptable risks are analyzed again in more detail with the method in order to uncover as yet unrecognized risks and/or uncertainties in the risk evaluation and where relevant extract corresponding consequences for improving the risk analysis. In particular, the knowledge base providing support for the persons involved in the technical project is analyzed in the method, where it is possible to estimate, by way of the identification of unacceptable risks, whether the knowledge base brought in is suitable for implementing the technical project successfully. With the aid of the method, in particular, all risks and the resultant potential cost of errors can be established and represented transparently in order to bring concrete need for action to bear at the correct point.

In order to make it possible to include the evaluated risks in a business administration balance sheet also, the quantitative evaluations of the risks are, in particular, monetary evaluations in units of money.

For the purposes of an especially vivid comparison of the qualitative and quantitative evaluations, steps c) and d) of the method are implemented in such a way that the comparison outcome for a risk is the position of the qualitative and quantitative evaluation of the risk in a two-dimensional graph, the qualitative evaluation scale being plotted on one axis of the graph and the quantitative evaluation scale on the other axis of the graph. In this case, the permissible region is defined as a delimited region in the two-dimensional graph.

In a further preferred embodiment of the method, each risk is assigned a probability of occurrence and a monetary amount of damage in the event of the occurrence of the risk, the quantitative evaluation of a respective risk being a function of the probability of occurrence multiplied by the monetary amount of damage. A simple and intuitive scheme for evaluating the risk quantitatively is created in this way.

In order to also represent the probabilities of occurrence of the risks transparently in the above-mentioned two-dimensional graph, the risks are, in an especially preferred embodiment of the method, depicted as flat objects at their positions in the two-dimensional graph, the size of a flat object depicting the probability of occurrence of the corresponding risk.

In a further embodiment, one or more of the risks are respectively assigned one or more events, the occurrence of which corresponds to the occurrence of the risk. In this respect, the events can define both causes for the respective risk and consequences of the respective risk.

Any desired risks can be taken into consideration with the aid of the method; preferably, the risks within the project are included, that is to say those risks that relate to the successful implementation of the project. It is also possible, however, for the risks not to be directly connected with the project sequence; for example, the risks can also be warranty risks that arise after the implementation of the project. In this respect, the probability of occurrence of a warranty risk is preferably given by the probability of damage covered by warranty to a technical component with reference to a predefined operating period of the technical component multiplied by the quantity of technical components and the monetary amount of the damage covered by warranty to the technical component.

In an especially preferred embodiment of the method, the qualitative evaluations are intuitive evaluations of the respective risks, the intuitive evaluations being determined by questioning of the persons involved in the technical project. Where relevant, however, it is also possible for the qualitative evaluations to originate at least partly from a technical risk analysis, in particular from the FMEA analysis.

The risk identification process of the method is preferably followed by a risk assessment process. Preferably, in this risk assessment process, the risks are subdivided into evaluation classes as a function of their respective quantitative evaluation, which comprise in particular the classes "tolerable", "critical", and "catastrophic". Where relevant, further classes can also be defined for further detail. For example, the classification can be effected according to a standard, such as e.g. IEC 61508.

The assessed risks are preferably also output on the basis of a two-dimensional graph. In this respect, the quantitative evaluations (QN) of the risks (R) are respectively characterized by a probability of occurrence (P) and a monetary amount of damage (DH) of the risk (R) and the risks are depicted as positions in the graph, the scale for the amount of damage being plotted on one axis of the graph and the scale for the probability of occurrence of the risk on the other axis of the graph. Delimited regions are then defined in the graph, each region corresponding to an evaluation class and the evaluation class of a risk being produced by the delimited region in which the position of the risk is situated in the two-dimensional graph. For the purposes of comparing the quantitative risk evaluations and the qualitative risk evaluations, the risks are preferably depicted as flat objects at their positions in the two-dimensional graph, the size of a flat object corresponding to the qualitative evaluation of the risk.

In a further version of the risk assessment process, the quantitative evaluations of the risks are again respectively characterized by a probability of occurrence and a monetary amount of damage of the risk and the risks are subdivided into accounting groups as a function of their probabilities of occurrence, the risks being treated differently in a company financial balance sheet as a function of the accounting group. By a quantitative evaluation of this type, while making allowance for accounting rules, the method allows the possibility of incorporating the risks for balance sheet purposes according to predefined international standards. For example, allowance can be made for the US-GAAP standard referred to in the introduction. This is accomplished by the fact that risks with a probability of occurrence of more than 80% are included in the balance sheet with their overall monetary amount of damage and risks with a probability of occurrence of 80% or less are inserted in the balance sheet with their quantitative evaluation, that is to say with the product of probability of occurrence and amount of damage. Moreover, risks with a probability of occurrence of less than 50% are preferably added together and reported in the balance sheet as a single item.

The processes of risk identification and risk assessment described above are preferably also followed in the method by an action planning process, with the aid of which the risks are reduced. The quantitative and qualitative evaluations of the risks are then preferably established again following the implementation of the action planning process, the risks before and after the action planning process then being compared with each other. This makes it possible to verify whether the defined action planning process results in an adequate reduction in the risks. In the action planning process, the monetary costs of the planned measures are preferably also estimated and compared with the cumulative quantitative evaluations of the risks before and after the action planning. This makes it possible in particular to establish the cost/benefit effect of the measures, it being possible in the case of excessively high costs of specific action plans to give consideration to implementing other or modified measures for reducing the costs.

In a further embodiment, the quantitative and qualitative evaluations of the risks are assessed according to one of the embodiments of the risk assessment process described in the foregoing following the action planning process.

BRIEF DESCRIPTION OF THE DRAWINGS

These and other objects and advantages will become more apparent and more readily appreciated from the following description of the preferred embodiments, taken in conjunction with the accompanying drawings of which:

FIG. 2 Two graphs which are generated in accordance with an embodiment of the method and which are used for identifying unacceptable risks;

FIG. 3 and FIG. 4 Graphs which are generated in accordance with an embodiment of the method and which depict in graphic form the classification of risks before and after an action planning phase.

DETAILED DESCRIPTION OF THE PREFERRED EMBODIMENT

Figure 1:
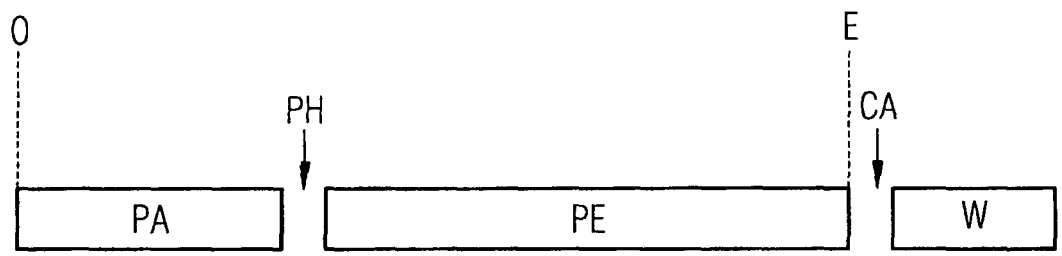
FIG. 1 A schematic representation of the project phases of a customer project in which the method according to one possible embodiment of the invention can be utilized.

Reference will now be made in detail to the preferred embodiments, examples of which are illustrated in the accompanying drawings, wherein like reference numerals refer to like elements throughout.

FIG. 1 shows in schematic form the individual processes in a technical customer project in which a technical system and/or a technical plant is to be developed according to the specifications of a customer. The processes comprise, at the beginning, the project acquisition phase PA, which is followed by the project execution phase PE. Various sub-processes are implemented in the project acquisition phase: in particular, a pre-acquisition process, the actual project acquisition, contractual negotiations and, in the case of successful acquisition, the project handover PH for implementation of the project. The project handover PH is succeeded by the project execution phase which also comprises a large number of sub-processes: in particular, a more detailed project planning process, the purchasing and manufacturing of the components of the technical system, the construction/installation of the components, the commissioning, and also the release to the customer for acceptance of the technical system that has been developed. The project is ultimately brought to a close with the final customer acceptance CA. The actual project is then finished and it is then followed by a further warranty phase W.

The method of risk analysis can be implemented at any point in the project between the project start 0 and the project end E. The method preferably accompanies the overall project from start to end. It is also possible, however, for the risk analysis to also only come into use if a project is in crisis, that is to say if there is a danger that the technical project is failing. In such a case, corresponding unrecognized risks can still be identified and corresponding measures evaluated where relevant with the aid of the method in order to still guide the project to a successful close.

In the foregoing, the utilization of the method has been described on the basis of a customer project. It is also conceivable, however, for the method to be utilized in any desired other types of project. In particular, the risk analysis method can also be used in development projects in which a new product is to be designed, developed, and manufactured for the market independently of a customer.

FIG. 2 shows two graphs D1 and D2 which clarify step of the method. In this respect, the graph D1 shows the outcome of a risk identification with the method where the technical project is supported by a poor knowledge base, that is to say the project is affected by uncertainties and the risks are not always correctly classified by those involved in the project and/or there is not sufficient information available to be able to evaluate the risks correctly. In contrast, D2 shows a risk identification in a project with a very good knowledge base where the technical project is affected by little uncertainty and the risks are classified correctly by the persons involved in the project.

The method is distinguished by the fact that not only is a qualitative evaluation of the risks performed but also a quantitative evaluation of the risks in the technical project. A comparison of the qualitative and quantitative risks then makes it possible to establish which risks are unacceptable, these plausible risks being further evaluated and analyzed in a next step in order to identify further risks and/or recognize uncertainties in the project and take counter-measures.

In the embodiment of the method described here, a monetary evaluation in euro is used as the quantitative risk evaluation, which is dependent firstly on the probability of the occurrence of the risk and secondly on the amount of damage in the event of the occurrence of the risk. In FIG. 2, the quantitative evaluation QN is plotted along the abscissa. In this respect, the quantitative evaluation is the product of the probability of the occurrence of the risk and the amount of damage. This quantitative evaluation QN is set against a qualitative evaluation QL which is plotted on the ordinate in the graphs in FIG. 2. Any desired types of qualitative evaluation can be used. An intuitive evaluation is preferably utilized as the qualitative evaluation, where the persons involved in the project are questioned with regard to the risks and are to state how they rate a specific risk on a scale. In this respect, a scale from 0 to 6 has been chosen in FIG. 2, where 0 means no risk and 6 a very high risk. The individual scale values 1 to 6 can also be linked to corresponding textual descriptions.

The individual risks are represented as bubbles in the graphs D1 and D2 in FIG. 2, where the size of a bubble, and in particular the diameter of the bubble, stands for the probability of the risk occurring. By way of example, a bubble is designated as a risk R in FIG. 2. The risks can be defined as desired in the method. For example, the risks can be defined by way of the causes that result in the corresponding damage, but it is also possible for the risks to be defined as a consequence, that is to say as a corresponding damaging event, independently of the causes.

In place of an intuitive qualitative evaluation of the risk, outcomes from known technical risk analysis methods can also be plotted along the scale QL, for example from the FMEA method (FMEA=Failure Mode and Effects Analysis), which is sufficiently well-known.

In the method, the quantitative evaluations of the risks are set against the qualitative evaluations. In the graph D1, which is supported by a poor knowledge base, a large amount of scatter is apparent which means that the quantitative evaluations of a risk frequently do not coincide with the qualitative evaluation of the corresponding risk. In order to identify such unacceptable risks, a permissible region is defined in the two-dimensional graphs D1 and D2 according to the method, where all risks outside this region are classified as unacceptable. The region is indicated in D1 and D2 by an upper boundary line L1 and a lower boundary line L2. In this respect, the graph is scaled in such a way that all risks are situated on the bisector of the angle L3 in the ideal case.

It can be seen in graph D1 that the risks R1, R2, and R3 situated in the upper region, in particular, are not plausible since they are situated above the boundary line L1. These risks are rated as very high intuitively, whereas the quantitative evaluation classifies the risk with a low value. Moreover, these risks exhibit a low amount of damage since the probability of the risks is relatively large and the amount of damage is the quotient of risk and probability. According to the method, it is therefore possible to identify, on the basis of the graph D1, the facts that certain risks are not plausible and the knowledge base of the project is affected by uncertainties. As a consequence, workshops and interviews can ultimately be implemented with all those involved in the project, in particular with the persons providing the financing and with the persons responsible for the project planning and implementation, in order to uncover blockages in the evaluation of the project where relevant and/or recognize further risks and possible causes of risks. In this way, the knowledge base of the project can be improved and risks that have not been recognized as yet can already be uncovered in the preliminary stages.

The graph D2 in FIG. 2 shows a technical project which is supported by a very good knowledge base. This can be seen from the fact that most of the risks are situated within the permissible region between the lines L1 and L2. Nevertheless, further risks can be uncovered even in the case of a good knowledge base, which were not recognized in the known qualitative evaluation techniques of the technical project. In particular, the risks R4 and R5 with very small bubbles below the line L2 are of interest here. These risks are classified as relatively insignificant with the qualitative evaluation. Although the risks exhibit a low probability based on their small bubble diameter, it is now recognized that allowance should definitely be made for the risks. In fact, the risks exhibit a very high amount of damage because the already quite high risk value of R4 and R5 is divided, for the purposes of establishing the amount of damage, by the very small probability of the risks, from which a very large number is produced. These risks can therefore result in catastrophic consequences not only for the technical project itself but also for the overall company that is developing the project. In fact, the amount of damage is so high in certain circumstances that it can no longer be borne by the resources of the company and therefore can result in the insolvency of the company. The graph D2 therefore produces a clear indication of how, by a linking of the quantitative and the qualitative evaluation of risks, risks not recognized as relevant originally nevertheless go into the risk analysis based on the exorbitant amount of damage.

FIG. 3 and FIG. 4 show the outcome of an assessment process of the method which is implemented following the identification of the risks as shown in FIG. 2. In this assessment process, the individual risks are classified and represented in a corresponding two-dimensional graph. Any desired standardized classification can be utilized as the classification. In the embodiment described here, the classification groups "tolerable" (designated by T), "critical" (designated by CR), and "catastrophic" (designated by CA) are used. In this respect, the classification of the risks is effected in such a way that—in contrast to FIG. 2—the amount of damage DH is now plotted along the abscissa and the probabilities of occurrence of the risks according to the quantitative evaluation on the ordinate, where the probabilities are subdivided into groups P1, P2, . . . , P6. Each of these groups P1-P6 is assigned a textual description as follows:

P0=no risk
P1=improbable risk
P2=not very probable risk
P3=occasional risk
P4=probable risk
P5=frequent risk
P6=very high risk The risks are again represented as bubbles, where the diameter of the bubbles now depicts the qualitative evaluation of the risk. In the graphs in FIGS. 3 and 4, the individual classification regions T, CR, and CA are defined by different regions in the graph. These regions are respectively separated from each other by lines L4 and L5. In this respect, the lines are stepped delimitations, where each vertical and horizontal section of the line is designated by the corresponding line symbol L4 or L5 for the purposes of clear identification of the course of the lines. In this respect, all risks that are situated below the line L4 are classified as tolerable and all risks that are situated above the line L5 are evaluated as catastrophic. In contrast, the risks above the line L4 and below the line L5 are evaluated as critical. Three classes of risks are therefore produced, which are depicted by different representations of the bubbles in FIG. 3. All critical risks in the region CR are represented as light bubbles in this respect, all tolerable risks below the line L4 are represented as dark bubbles, and all catastrophic risks above the line L5 are depicted as dark, spotted bubbles. In this respect, FIG. 3 shows the representation of the risks before measures have been planned. It can be seen that there are three catastrophic risks above the line L5, and corresponding measures are then planned in order to attempt to eliminate these catastrophic risks and also to substantially reduce the quantity of critical risks.

The outcome of such action planning is represented in FIG. 4. FIG. 4 shows a similar representation to FIG. 3, but here the risks are depicted after the action planning. In order to enable a comparison with FIG. 3, the coloring of the bubbles assigned to the risks in FIG. 3 has not been changed so that it can be seen in FIG. 4 how the corresponding risks were classified before the action planning. It can be seen that the action planning delivers success. In particular, two catastrophic risks have been completely eliminated and the third catastrophic risk has migrated into the region CR so that it is now only a critical risk. Moreover, a large number of critical risks have also been eliminated or reduced in such a way that they are now tolerable risks. The risk assessment just described therefore makes it possible to implement a comparison of the risks before and after action planning very effectively and to recognize intuitively and rapidly whether the action planning produced success.

Since the risks are classified quantitatively on the basis of a monetary evaluation scheme in the embodiment of the method described here, an economic evaluation of the risks can be performed in a simple manner. In particular, the risks can be included in the financial balance sheet of a company according to their monetary values in terms of damage. A special advantage relates to in the fact that the risks can be inserted in the balance sheet according to the well-known accounting rules under US-GAAP (United States Generally Accepted Accounting Principles). This is clarified in FIG. 5.

Figure 5:
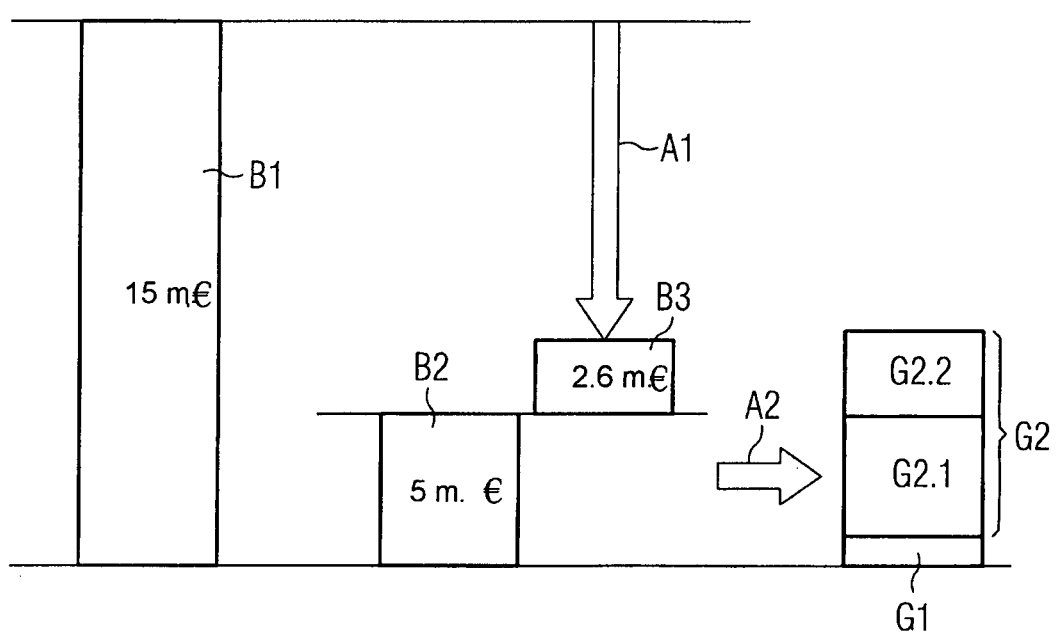
FIG. 5 A schematic representation which shows the balance sheet-oriented evaluation of risks in accordance with an embodiment of the method.

FIG. 5 shows the cumulative value of all monetary quantitative risk evaluations before action planning as column B1. The cumulative value of all quantitative risk evaluations after the action planning is represented as column B2. Moreover, a column B3 is depicted, which depicts the costs for the implementation of the measures. It can be seen in FIG. 5 that the action planning results in a reduction in risk which is indicated by the arrow A1 in FIG. 5. In particular, original risks of 15 million euro are set against risks of 5 million euro plus action costs of 2.6 million euro. This results in a monetary benefit of $$(15 \text{ million euro} - (5 \text{ million euro} + 2.6 \text{ million euro})) = 7.4 \text{ million euro}.$$

The risks assessed with the method can be subdivided into the groups G1 and G2 as shown in FIG. 5 for recording for balance sheet purposes, where the group G2 is subdivided again into the sub-groups G2.1 and G2.2. The step comprising the balance sheet-oriented subdivision of the risks is indicated by the arrow A2 in FIG. 5. In the embodiment described here, the accounting rules according to US-GAAP are used. According to these, all risks that exhibit a probability of more than 80% are inserted in the balance sheet with their amount of damage. These risks belong to the group G1. All other risks that exhibit a probability of 80% or less are included in the balance sheet with their respective quantitative values, that is to say amount of damage multiplied by probability of occurrence. These risks belong to the group G2. The group G2 is subdivided again into the groups G2.1 and G2.2. The group G2.1 contains all risks with a probability between 50% and 80%. These risks must all be reported separately in the balance sheet. In contrast, risks with a probability of less than 50% can be inserted in the balance sheet as overall items (so-called "Net Risk Exposure"). As is shown by the foregoing description, not only can an improved identification of risks therefore be achieved with the method but, based on their quantitative evaluation, the risks can also be assessed very effectively in economic terms while making allowance for accounting rules.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method of analyzing risks in developing at least a portion of a technical system, comprising:
   performing a large number of technical evaluations of risks in the technical system;
   performing a large number of monetary evaluations of the risks;
   comparing the technical and monetary evaluations for each risk to produce a comparison outcome for each risk;
   defining a permissible region by setting the monetary evaluations of risks against technical evaluations of the risks;
   classifying each risk having a comparison outcome outside of the permissible region as an implausible risk; and
   analyzing, by a processor, the implausible risks in order to identify uncertainties in the analyzing of risks and to identify further risks, and
   wherein the risks comprise warranty risks,
   wherein each risk is assigned a probability of occurrence and a monetary amount of damage upon occurrence, the monetary evaluation being a function of the probability of occurrence multiplied by the monetary amount of damage, and the probability of occurrence of a warranty risk is probability of damage covered by a warranty to a technical component within a predefined operating period of the technical component multiplied by a quantity of technical components and a monetary amount of damage covered by the warranty for the technical component.

2. The method as claimed in claim 1, wherein a result of the analyzing indicates a permissible region defined as a delimited region in a two-dimensional graph.

3. The method as claimed in claim 1, wherein the evaluations are compared and the permissible region is defined in such a way that the comparison outcome for each risk is a position of the technical and monetary evaluations of the risk in a two-dimensional graph, a technical evaluation scale being plotted on one axis of the graph and a monetary evaluation scale being plotted on another axis of the graph.

4. The method as claimed in claim 3, wherein the permissible region is a delimited region in the two-dimensional graph.

5. The method as claimed in claim 1, wherein each risk is assigned a probability of occurrence and a monetary amount of damage upon occurrence, the monetary evaluation upon being a function of probability of occurrence multiplied by the monetary amount of damage.

6. The method as claimed in claim 5, wherein the risks are depicted as flat objects in the two-dimensional graph, a size of each flat object depicting the probability of occurrence of the corresponding risk.

7. The method as claimed in claim 1, wherein at least one risk is assigned an event, the occurrence of which corresponds to the occurrence of the risk.

8. The method as claimed in claim 7, wherein the event causes the risk.

9. The method as claimed in claim 7, wherein the event defines a consequence of the risk.

10. The method as claimed in claim 1, wherein the risks comprise project risks.

11. The method as claimed in claim 1, the technical evaluations comprise intuitive evaluations of the respective risks, the intuitive evaluations being performed by questioning people involved in developing the technical system.

12. The method as claimed in claim 1, wherein the technical evaluations originate at least partly from a Failure Mode and Effects Analysis FMEA technical risk analysis.

13. The method as claimed in claim 1, wherein risks are analyzed after a risk identification process.

14. The method as claimed in claim 13, wherein, in analyzing the risks, the risks are divided into evaluation classes as a function of their respective monetary evaluations, the evaluation classes comprising "tolerable", "critical", and "catastrophic".

15. The method as claimed in claim 14, wherein each monetary evaluation is determined by a probability of occurrence and a monetary damage amount, the amount of monetary damage being plotted on one axis of a two-dimensional graph and the probability of occurrence being plotted on another axis of the graph.

16. The method as claimed in claim 15, wherein delimited regions are defined in the two-dimensional graph, each delimited region corresponding to one of the evaluation classes, and positions of the risks in the two-dimensional graph determine respective evaluation classes.

17. The method as claimed in claim 15, wherein the risks are depicted as flat objects in the two-dimensional graph, a size of each flat object corresponding to the technical evaluation of the risk.

18. The method as claimed in claim 13, wherein each monetary evaluation is determined by a probability of occurrence and a monetary damage amount of the risk, the risks are subdivided into accounting groups as a function of their probabilities of occurrence, and the risks are treated differently in a financial balance sheet of a company as a function of the accounting group.

19. The method as claimed in claim 18, wherein risks with a probability of occurrence of more than 80% are included in the balance sheet with their monetary damage amount, and risks with a probability of occurrence of 80% or less are included in the balance sheet with their monetary evaluation.

20. The method as claimed in claim 19, wherein risks with a probability of occurrence of less than 50% are added together and reported in the balance sheet as a single item.

21. The method as claimed in claim 13, wherein the method for analyzing risks is followed by an action planning process for reducing the risks, the monetary and technical evaluations of the risks being performed again following the action planning process with the risks being compared before and after the action planning process.

22. The method as claimed in claim 21, wherein, following the action planning process, monetary costs of planned corrective measures are estimated and compared with cumulative monetary evaluations of the risks before and after the action planning process.

23. The method as claimed in claim 21, wherein the quantitative and technical evaluations of the risks are assessed according to a risk assessment process following the action planning process.

* * * * *